United States Patent Office
2,904,534
Patented Sept. 15, 1959

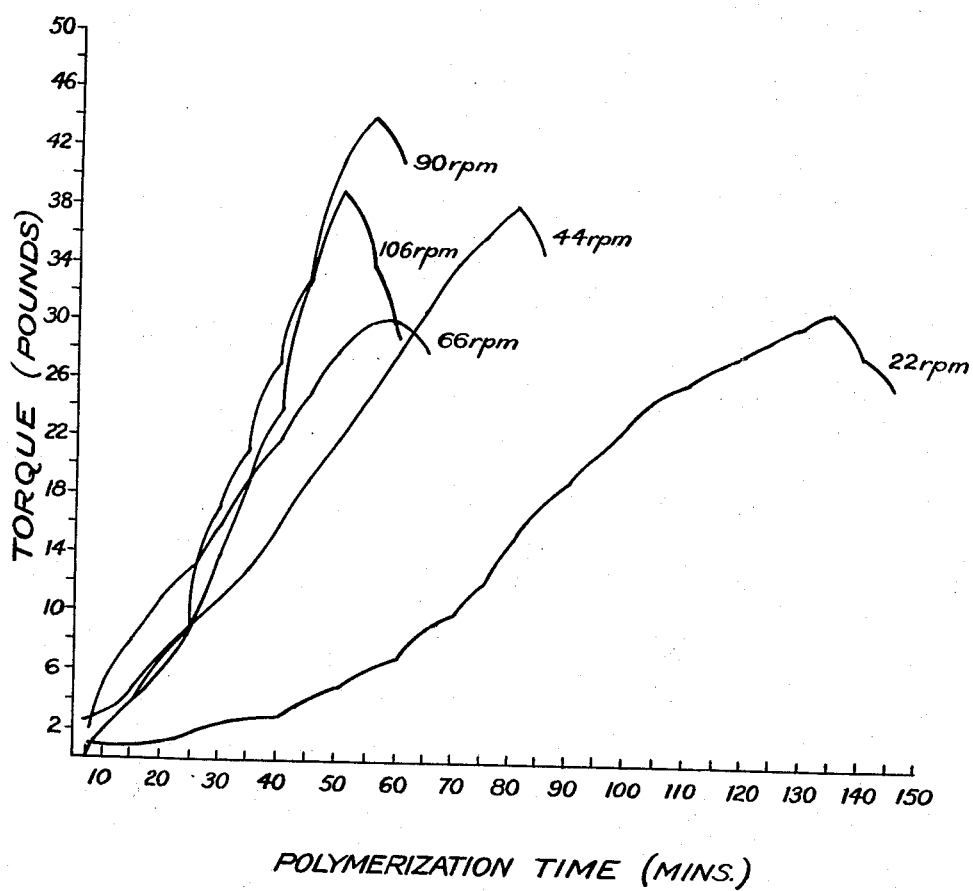

2,904,534

MANUFACTURE OF POLYESTERS UNDER CONTROLLED VARYING AGITATION

Jack L. R. Williams and Kenneth R. Dunham, Rochester, N.Y., assignors to Eastman Kodak Company, Rochester, N.Y., a corporation of New Jersey Application May 29, 1956, Serial No. 587,976

2 Claims. (Cl. 260—75)

This invention relates to an improved process for the manufacture of polyesters and is particularly concerned with a process whereby the batch polymerization of glycol diesters of aromatic or aliphatic dicarboxylic acids can be readily effected to give highly polymeric linear polymers without degradation and of a uniformity which was not possible by the methods employed heretofore.

The preparation of polyesters by ester interchange between at least one glycol and at least one aromatic or aliphatic dicarboxylic acid, preferably in ester form, to form a glycol diester of the dicarboxylic acid followed by polymerization to a highly polymeric solid polymer is well known in the art and has been widely used for the manufacture of highly polymeric polymethylene terephthalates such as disclosed in U.S. 2,465,319 and many other patents on different polyesters. The general method of preparation of a large number of crystalline synthetic linear superpolymers is described in U.S. 2,071,250, and the present invention is a specific process improvement on the type of polymerization process described in such patents.

Although the chemistry of the polymerization processes to form polyesters, polyamides, polyester-amides, copolyesters and the like is well known and involves heating of the initial diester first at atmospheric pressure and then at a reduced pressure, the commercial manufacture requires that the polymerization process be such that the results will be reproducible from one batch to another. Thus, it is usually desirable to carry the polymerization to a state at which the polymer has a predetermined inherent viscosity which is usually above 0.4 and to ensure that each batch of the polymer thus formed is like all preceding and subsequent batches.

Thus although the chemistry of the polymerization process is now well worked out, it is desirable to provide methods for controlling the commercial manufacture using the type of processes known to the art.

It is accordingly an object of this invention to provide a new and improved process for preparing highly polymeric crystalline synthetic linear polymers and particularly for preparing highly polymeric polyesters.

Another object of the invention is to provide a new method whereby the course of the polymerization can be readily controlled by external measurement and whereby the polymerization can be carried to a predetermined stage which duplicates preceding and subsequent batches of the same polymer.

Another object of the invention is to provide a method whereby the desired superpolymers are prepared without the concomitant formation of varying amounts of degradation products which lead to nonuniformity in the final product.

Other objects will be apparent from the description and claims which follow.

These and other objects of the invention have been achieved by the discovery that in the polymerization process for forming condensation polymers such as polyesters, polyamides and the like, the amount of torque developed during the stirring of the molten polymerization mixture provides an accurate measure of the course of the polymerization, and that the amount of torque developed at any given rate of stirring of the melt gradually ascends to a maximum value and then drops off sharply as the polymer begins to degrade due to the stirring shear in the viscous melt. It has been found that unusually good results are obtained by effecting the polymerization at torque values which are always maintained below the maximum torque which is developed for any given stirring rate so that the stirring rate is decreased before the torque goes through to maximum value at that rate and the stirring is successively reduced during the course of the polymerization whereby the desired inherent viscosity can be achieved without the formation of any objectionable amount of degradation products which would otherwise deleteriously affect the uniformity of the product. We have found that, generally speaking, the glycol diester of the dicarboxylic acid which is to be polymerized should be stirred in the melt at an initial rate of at least 60 r.p.m. and preferably at least 90 r.p.m. in order to effect the initial steps of the polymerization at commercially practicable rates but that this initial stirring rate should be maintained only throughout the period in which the torque necessary to maintain such a stirring rate continues to rise. Before the torque passes through to maximum value at such initial rate of stirring, the stirring rate is reduced to a lower number of revolutions per minute whereby the torque necessary to maintain such a lower rate is on an ascending portion of the torque curve and such slower rate is then continued but reduced before it passes through to maximum value also. By progressively adjusting the rate of stirring downwardly at intervals throughout the course of the polymerization before the torque passes through to maximum value at each such rate, highly reproducible batches of polymeric product are obtained and the inherent viscosity can be carefully controlled to a predetermined value.

This effect of the stirring rate on the character of the polymeric product was wholly unexpected, but it was found that each stirring rate possessed a characteristic torque curve which rose to a maximum value and then fell off sharply as the polymerization time increased. A family of such torque value curves is shown in the drawings wherein polyethylene terephthalate was polymerized at varying stirring rates and the maximum value was found as measured in pounds of torque. It will be noted that each rate had a different maximum, but that generally the maximum torque for any given rate was in excess of 30 pounds. Consequently, for commercial operations, it is desirable to maintain the torque value at or below 30 pounds throughout the polymerization. In order to accomplish this, the torque necessary to maintain the initial stirring rate is followed until the torque approaches 30 pounds whereupon the stirring rate is reduced and the lower rate maintained until it approaches 30 pounds torque whereupon the stirring rate is again reduced. Since the polymerization requires a rather prolonged heating period, this invention permits the polymerization to be carried out at the maximum possible rate consistent with the desired uniformity of results by using an initially high stirring rate and gradually reducing the rate to one at which the degradation occurs only after a prolonged period of heating.

The preparation of linear condensation superpolymers is well known in the art, and the details of the times, temperatures, catalysts, types of reactants and the like form no part of this invention and need not be described here since they are well known to those skilled in the art. The effect of the rate of stirring on the torque buildup and its passage through a definite maximum at which degradation begins to occur is shown in Table I wherein the torque values are set out for varying times and varying stirring rates during the second stage or polymerization stage of the condensation reaction. As is well known, the second stage of the polymerization is that stage at which the low viscosity, low molecular weight prepolymers are subjected to reduced pressures and elevated temperatures in order to carry the polymer to high molecular weights and to give inherent viscosities in the fiber-forming range. The data shown in Table I was obtained by the polymerization of the ethylene glycol diester of terephthalic acid to give highly polymeric polyethylene terephthalate.

Table I

| Time, 2nd stage (min.): | Torque, 22 r.p.m. | Torque, 44 r.p.m. | Torque, 66 r.p.m. | Torque, 90 r.p.m. | Torque, 106 r.p.m. |
| --- | --- | --- | --- | --- | --- |
| 0 | | | | 0 | 0 |
| 5 | 1 | 3 | 2 | 2 | 2 |
| 10 | 1 | 4 | 5 | 2 | 4 |
| 15 | 1 | 5 | 8 | 4 | 7 |
| 20 | 1 | 7 | 11 | 6 | 9 |
| 25 | 2 | 9 | 13 | 9 | 9 |
| 30 | 2 | 11 | 16 | 14 | 17 |
| 35 | 3 | 13 | 19 | 19 | 21 |
| 40 | 3 | 16 | 22 | 24 | 27 |
| 45 | 3 | 19 | 25 | 33 | 33 |
| 50 | 4 | 22 | 28 | 41 | 39* |
| 55 | 5 | 22 | 30* | 44* | 34 |
| 60 | 6 | 25 | 30 | 41 | 29 |
| 65 | 7 | 28 | 28 | | |
| 70 | 9 | 31 | | | |
| 75 | 10 | 34 | | | |
| 80 | 12 | 36 | | | |
| 85 | 15 | 38* | | | |
| 90 | 17 | 35 | | | |
| 95 | 19 | | | | |
| 100 | 21 | | | | |
| 105 | 23 | | | | |
| 110 | 25 | | | | |
| 115 | 26 | | | | |
| 120 | 27 | | | | |
| 125 | 28 | | | | |
| 130 | 29 | | | | |
| 135 | 30 | | | | |
| 140 | 31* | | | | |
| 145 | 28 | | | | |
| | 26 | | | | |
| Inherent viscosity | 0.89 | 0.78 | 0.67 | 0.66 | 0.68 |

In the table, the starred torque indicates the maximum value of the torque at the particular stirring rate which was used throughout polymerization. As can be seen from the table and from the graph of this data as set out in the drawing, the torque passes through a definite maximum value with increasing time and then begins to fall off rapidly due to degradation of the polymer being formed. The inherent viscosity measurements shown as the last item in Table I indicate the rather wide variation in the products obtained even though the polymerization conditions, reactants, catalyst and similar variable factors were kept constant from batch to batch.

By means of this discovery, we have found that much more reproducible results can be obtained and degradation product formation substantially avoided by carrying out the polymerization at stirring rates below the maximum torque value at all times for such rate and successively reducing the stirring rate before the torque reaches its maximum value. In this way, highly reproducible polyesters can be obtained even at widely varying polymerization times, and the invention is thus applicable to any of the polyester processes as well as processes for making other condensation polymers by the same type of superpolymerization.

Table II illustrates a number of polymerizations of the

Table II

| | 1 | | 2 | | 3 | | 4 | | 5 | | 6 | |
| --- | --- | --- | --- | --- | --- | --- | --- | --- | --- | --- | --- | --- |
| | Time, 2nd stage (min.) | Torque range | Time (min.) | Torque range | Time (min.) | Torque | Time (min.) | Torque | Time (min.) | Torque | Time (min.) | Torque |
| R.p.m.: | | | | | | | | | | | | |
| 90 | 5 | 0-6 | 16 | 0-5.5 | 13 | 0-5.5 | 15 | 0-3 | 50 | 0-21 | 35 | 0-30 |
| 66 | 5 | 4-6.5 | | | 12 | 5.5-12 | 10 | 6-9 | | | | |
| 40 | 20 | 5-9 | 24 | 3.5-12 | 5 | 10-16 | 5 | 8-12 | 15 | 17-21 | 15 | 17-21 |
| 22 | 5 | 6-8 | 5 | 5.5-10 | 30 | -15 | 22 | 12-15 | | | | |
| 18 | | | 40 | 4-15 | | | | | | | | |
| 14 | 95 | 6-22 | 55 | 18-20 | 70 | 12-28 | 30 | 15-20 | 75 | 10-24 | 45 | 15-24 |
| 7.5 | | | | | 10 | 24-25 | | | | | | |
| Total time | 130 | | 140 | | 140 | | 82 | | 140 | | 95 | |
| I.V. | 0.83 | | 0.80 | | 0.88 | | 0.86 | | 0.79 | | 0.86 | | ethylene glycol diester of terephthalic acid with varying times of stirring at various rates, all below the maximum torque values, and for varying total polymerization times.

As can be seen from Table II, the inherent viscosity varied little from batch to batch even though the times for the total polymerization and for various stages of the polymerization varied quite widely. The batches all have the common characteristic that at no time was the batch stirred at a particular rate until the torque value reached or exceeded the point at which it began to break downwardly due to polymer degradation. Thus it is possible to carry out a commercial polymerization process in batch fashion or even continuously in some cases by following the course of the polymerization by means of the torque necessary to maintain stirring of the molten polymer in the polymerizer. This greatly facilitates the commercial manufacture of superpolymers and is of particular importance in the manufacture of polyesters by the polymerization of glycol diesters of aromatic dicarboxylic acids. The torque relationships described herein have been found to hold for other polyesters than the polymethylene terephthalates including such polyesters as those prepared from the cyclohexane dimethanol diester of terephthalic acid, the polymethylene glycol diesters of sulfonyldibenzoic acid, and the glycol diesters of N,N'-bis(p-carboxybenzoyl)alkylene diamines. With varying reactants, catalysts, polymerization temperatures and pressures, and similar factors being variable, the time at which any particular stirring rate is reduced as well as the maximum torque value in pounds will vary from one polymerization to another, but the course of the reaction can be readily controlled by merely checking the torque values with increasing times and reducing the rate of stirring when the torque appears to be dropping below the previous values at that rate.

Thus by means of this invention the commercial manufacture of condensation polymers is greatly facilitated and means is provided whereby control of the polymerization can be mechanically effected without the necessity of sampling the polymer during the course of the reaction.

Although the invention has been described in detail with particular reference to certain preferred embodiments thereof, variations and modifications can be effected within the spirit and scope of the invention as described hereinabove, as illustrated in the drawing, and as defined in the appended claims.

We claim:
1. The process which comprises heating a glycol diester of an aromatic dicarboxylic acid at a temperature above the melting point of said diester, stirring the resulting melt at an initial rate of at least 60 r.p.m., continuing said heating and stirring while said diester polymerizes, said heating being sufficient to maintain the resulting polymer in the molten state throughout the polymerization, continuing said stirring at said initial rate while the torque necessary to maintain said initial stirring rate continues to rise, reducing said stirring rate when said torque reaches the vicinity of 30 pounds but before said torque exceeds 30 pounds, thereafter adjusting the rate of stirring to successively lower stirring rates as the torque approaches 30 pounds but before said torque exceeds 30 pounds at the stirring rate being employed, said polymerizing being carried out until a polyester is obtained having an inherent viscosity above 0.4.

2. The process which comprises heating a glycol diester of terephthalic acid at a temperature above the melting point of said diester, stirring the resulting melt at an initial rate of at least 90 r.p.m., continuing said heating and stirring while said diester polymerizes, said heating being sufficient to maintain the resulting polymer in the molten state throughout the polymerization, continuing said stirring at said initial rate while the torque necessary to maintain said initial stirring rate continues to rise, reducing said stirring rate when said torque reaches the vicinity of 30 pounds but before said torque exceeds 30 pounds, thereafter adjusting the rate of stirring to successively lower stirring rates as the torque approaches 30 pounds but before said torque exceeds 30 pounds at the stirring rate being employed, said polymerizing being carried out until a polyester is obtained having an inherent viscosity above 0.4.

References Cited in the file of this patent

UNITED STATES PATENTS 2,758,915    Vodonik _____ Aug. 14, 1956